United States Patent
Coronado et al.

(10) Patent No.: US 10,587,464 B2
(45) Date of Patent: Mar. 10, 2020

(54) AUTOMATIC PROVISIONING OF A SOFTWARE DEVELOPMENT ENVIRONMENT

(71) Applicant: ACCENTURE GLOBAL SOLUTIONS LIMITED, Dublin (IE)

(72) Inventors: Christian Owen Ramirez Coronado, Pasig (PH); Ma. Angelica Dueñas Serrano, Cainta (PH); Renn Louie Salonga Pineda, Pampanga (PH); Bianca Denise Agnes Del Puerto, Makati (PH); Cleopatra Nery Daquis, San Mateo (PH); Ken Louise Catalino Toyama, Mandaluyong (PH)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 98 days.

(21) Appl. No.: 16/041,385

(22) Filed: Jul. 20, 2018

(65) Prior Publication Data
US 2019/0028336 A1  Jan. 24, 2019

Related U.S. Application Data

(60) Provisional application No. 62/535,717, filed on Jul. 21, 2017.

(51) Int. Cl.
*H04L 12/24* (2006.01)
*G06F 9/50* (2006.01)
(Continued)

(52) U.S. Cl.
CPC ............ *H04L 41/0806* (2013.01); *G06F 8/20* (2013.01); *G06F 8/60* (2013.01); *G06F 8/63* (2013.01);
(Continued)

(58) Field of Classification Search
CPC ..... G06F 8/30; G06F 8/36; G06F 8/45; G06F 8/70; G06F 8/71; G06F 9/44; G06F 9/46;
(Continued)

(56) References Cited

U.S. PATENT DOCUMENTS 8,924,453 B2 * 12/2014 Fastow ................... G10L 15/08
                                                           708/490
9,852,524 B2 * 12/2017 Ricci .................... G06F 3/04842
(Continued)

*Primary Examiner* — Ninos Donabed
(74) *Attorney, Agent, or Firm* — Mannava & Kang, P.C.

(57) ABSTRACT

An automatic environment provisioning system receives a user request for auto provisioning of a development environment and automatically creates an environment per the user's request on a cloud platform. The user's request includes a selection of a technology platform on which to create the environment in addition to other system requirements. The user's input for generating the environment including the selection of a technology platform is employed for generating a template. The template can reference individual identifiers of various images corresponding to the software resources associated with the user's selected technology platform. The template enables instantiating the images with identifiers associated with the user-selected technology platform in order to enable creating the auto-provisioned environment. One or more users can be provided access to the auto-provisioned environment to of develop, test and/or implement the solution.

18 Claims, 18 Drawing Sheets

(51) Int. Cl.

| | | |
|---|---|---|
| *H04L 29/08* | (2006.01) | |
| *G06F 8/70* | (2018.01) | |
| *G06F 21/62* | (2013.01) | |
| *H04L 29/06* | (2006.01) | |
| *G06F 9/451* | (2018.01) | |
| *G06F 8/60* | (2018.01) | |
| *G06F 8/20* | (2018.01) | |
| *G06F 8/61* | (2018.01) | |
| *G06F 21/57* | (2013.01) | |

(52) U.S. Cl.
CPC ............... *G06F 8/70* (2013.01); *G06F 9/451* (2018.02); *G06F 9/5077* (2013.01); *G06F 21/6218* (2013.01); *H04L 41/0879* (2013.01); *H04L 41/0886* (2013.01); *H04L 41/22* (2013.01); *H04L 63/10* (2013.01); *H04L 67/10* (2013.01); *H04L 67/34* (2013.01); *G06F 21/57* (2013.01)

(58) Field of Classification Search
CPC ..... G06F 9/5072; G06F 16/958; G06Q 10/06; G06Q 10/06313; H04L 41/5054
See application file for complete search history.

(56) References Cited

U.S. PATENT DOCUMENTS

| | | | | |
|---|---|---|---|---|
| 10,096,053 B2* | 10/2018 | Patel | | G06Q 30/0625 |
| 10,298,770 B1* | 5/2019 | Liu | | H04M 7/0087 |
| 10,348,902 B1* | 7/2019 | Liu | | H04M 3/5235 |
| 10,379,717 B2* | 8/2019 | Ricci | | G06F 3/04842 |
| 2010/0030598 A1* | 2/2010 | Kamalakantha | | G06Q 10/06 705/7.23 |
| 2010/0042670 A1* | 2/2010 | Kamalakantha | | G06F 9/5072 709/203 |
| 2012/0042263 A1* | 2/2012 | Rapaport | | G06Q 30/02 715/753 |
| 2013/0095864 A1* | 4/2013 | Marovets | | H04W 4/14 455/466 |
| 2013/0159371 A1* | 6/2013 | Fastow | | G10L 15/08 708/490 |
| 2013/0212556 A1* | 8/2013 | Heyhoe | | G06F 8/71 717/106 |
| 2013/0311222 A1* | 11/2013 | Chaturved | | G06Q 10/06398 705/7.15 |
| 2014/0129703 A1* | 5/2014 | Patel | | G06Q 30/0625 709/224 |
| 2014/0143752 A1* | 5/2014 | Rumer | | G06F 8/30 717/106 |
| 2014/0278808 A1* | 9/2014 | Iyoob | | G06Q 30/0206 705/7.35 |
| 2014/0279201 A1* | 9/2014 | Iyoob | | G06Q 30/0631 705/26.7 |
| 2014/0372862 A1* | 12/2014 | Zhang | | G06F 16/958 715/229 |
| 2015/0156065 A1* | 6/2015 | Grandhe | | H04L 41/5054 709/224 |
| 2015/0188927 A1* | 7/2015 | Santhi | | H04L 63/104 726/4 |
| 2015/0206207 A1* | 7/2015 | Narasimhan | | G06Q 30/0283 705/400 |
| 2015/0222723 A1* | 8/2015 | Adapalli | | H04L 67/2809 705/26.41 |
| 2016/0014042 A1* | 1/2016 | Kampas | | G06F 9/50 709/226 |
| 2016/0019636 A1* | 1/2016 | Adapalli | | G06Q 30/0641 705/26.62 |
| 2016/0120368 A1* | 5/2016 | Hackert | | A47J 43/07 700/275 |
| 2018/0052430 A1* | 2/2018 | Kawano | | G05B 11/01 |
| 2018/0075009 A1* | 3/2018 | Baryshnikov | | G06Q 30/0641 |
| 2018/0122105 A1* | 5/2018 | Ricci | | G06F 3/04842 |
| 2018/0143808 A1* | 5/2018 | Puri | | G06Q 10/0631 |
| 2018/0191884 A1* | 7/2018 | Goldgraber | | H04M 3/42221 |

* cited by examiner

| ID | OPPORTUNITY NAME | OPPORTUNITY / RUNNING PROJECT | PROJECT NAME | PROJECT TYPE | WBS | TECHNOLOGIES | DEAL SIZE | DEAL STATUS | REQUESTER / POC | DATE MODIFIED | VALIDATION | ACTIONS |
|---|---|---|---|---|---|---|---|---|---|---|---|---|
| 8 | TEST OPPORTUNITY | OPPORTUNITY | SAMPLE PROJECT | AO | 76836AG | JAVA.NET | 1.1 | IN PROGRESS | SAMPLE | 2017-03-03 | PROVISIONED | |
| 13 | SAMPLE | RUNNING PROJECT | SAMPLE | AO | 231 | JAVA | 6.3 | IN PROGRESS | SAMPLE | 2017-05-08 | PROVISIONED | |
| 15 | SAMPLE | RUNNING PROJECT | SAMPLE | AO | 12873AJH | JAVA | 1.1 | WON | SAMPLE | 2017-05-09 | | |

TOOLS   REPORTS   ENVIRONMENTS

UT  PRESENTED ARE THE RE

CLOUD SERVER AND                                                    BY ACCENTURE. IT IS
LISA-ADOP                                                           ENTS/PROJECTS USE
SAMPLEOPP                                                           INSTANCES OF
ENVIRONMENT NAME              ENVIRONMENT IS NOW BEING CREATED.

T2.LARGE
INSTANCE TYPE                 LISA IS NOW PROVISIONING YOUR
                              ENVIRONMENT
TICKET NUMBER          20
                              SIT BACK, THIS WILL TAKE APPROXIMATELY 30 MINUTES.
UPTIME                        YOU MAY CHECK YOUR ENVIRONMENTS PAGE LATER ON TO
                              CHECK IF YOUR ENVIRONMENT IS READY.
HRS / DAY              24

DAY / MONTH            31          OK           GO TO ENVIRONMENTS

MONTHLY COST (USD)  $157.38

T2.LARGE SPECIFICATIONS
                                    ○ VCPU           2
                                    ≡ ECU            VARIABLE
                                    △ MEMORY         8 GB

OVERRIDE         CREATE ENVIRONMENT

*FIG. 13B*

AUTOMATIC PROVISIONING OF A SOFTWARE DEVELOPMENT ENVIRONMENT

PRIORITY

The present application claims priority under 35 U.S.C. 119(e) to the U.S. Provisional Patent Application Ser. No. 62/535,717, having a filing date of Jul. 21, 2017, the disclosure of which is hereby incorporated by reference in its entirety.

BACKGROUND

The presence of computers in almost every home, office and factory has led to computing systems forming the core of an organization. Changes to any aspect of the organization necessitate changes to the hardware or software of the computing systems. The need to implement changes faster may require changes to computing systems to be developed and rolled out more efficiently. The code changes however, may not be easily implemented as the task not only involves developing the code but also includes additional steps such as testing, documenting and the like. The capital expenses associated with upgrading computing systems can be reduced by using cloud computing services offered by many cloud service providers. Cloud computing services can include providing services associated with servers, databases, analytics and the like over the Internet.

BRIEF DESCRIPTION OF DRAWINGS

Features of the present disclosure are illustrated by way of examples shown in the following figures. In the following figures, like numerals indicate like elements, in which:

FIG. 12 shows the reports page of the LISA application in accordance with some examples disclosed herein.

FIG. 13B shows a display that is generated during the creation and provisioning of an environment in accordance with some examples disclosed herein.

DETAILED DESCRIPTION

Figure 1:
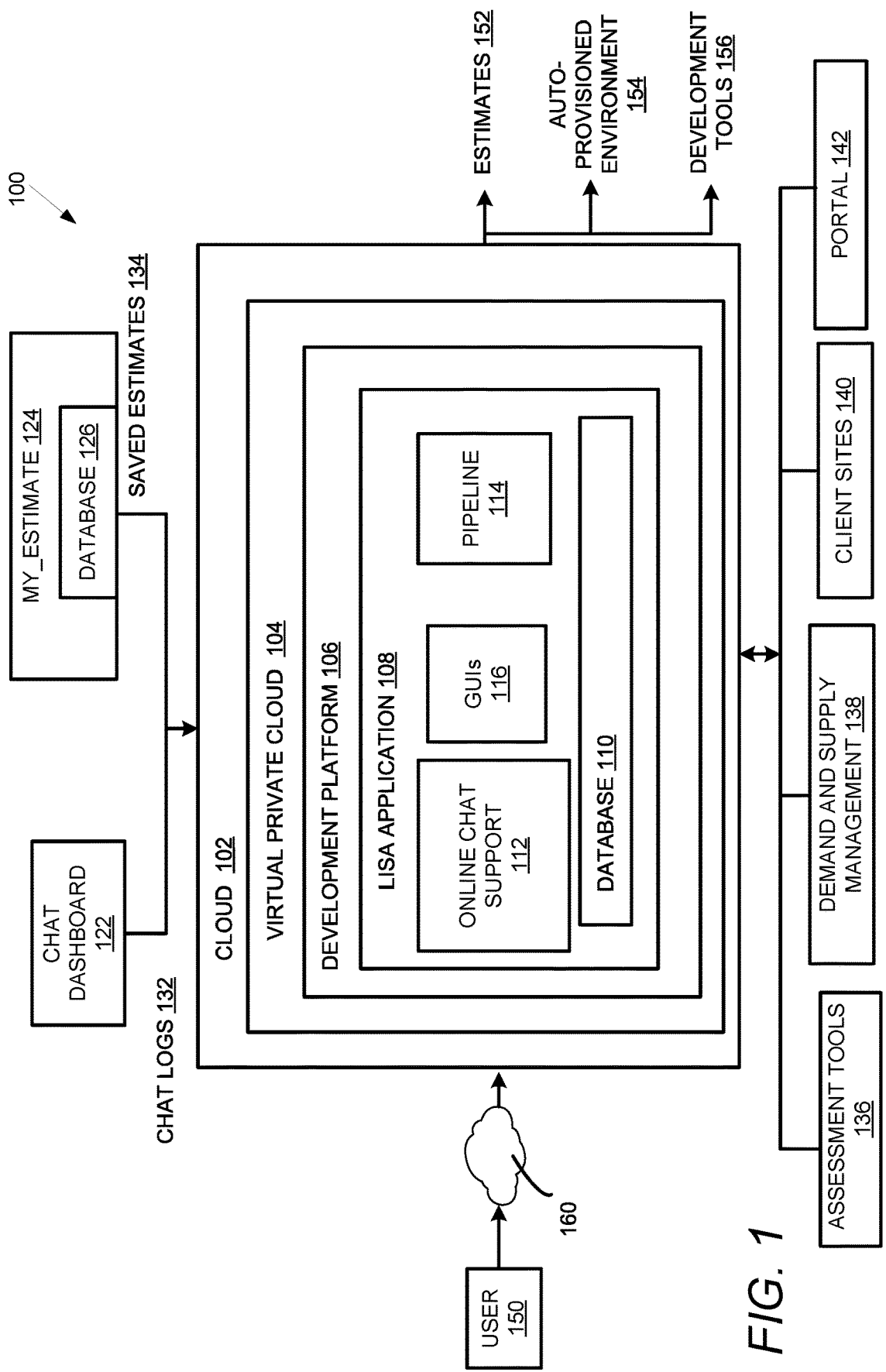
FIG. 1 shows a block diagram of an automatic environment provisioning (AEP) system including a liquid intelligent solution automation (LISA) application in accordance with some examples disclosed herein.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a liquid intelligent solution automation (LISA) application or an automatic environment provisioning (AEP) system for receiving a user request regarding a solution and creating an environment on a cloud platform based on the user request is disclosed. An environment can include resources required to, one or more of generate code for the solution, test the code, launch and host the solution. In an example, the solution can include a software application that is employed by users to execute one or more functions using computing devices. By the way of illustration, the environment can include but is not limited to, the hardware resources such as processors, short term and long term memory storage units, I/O modules, communication equipment, busses connecting the various hardware resources and the like. The environment can additionally include software resources hosted on the aforementioned hardware wherein the software resources can include but are not limited to server software to host operating systems, applications, development tools, testing tools, automated scripts and a variety of other software aids for developing the solution. The environment can service a single developer or multiple developers. The solution developed within the environment can either be hosted within one or more of a cloud platform, a virtual private cloud on the cloud platform or an external hosting system that is outside the cloud platform. In some examples, the environment created can be a base environment that meets certain minimum requirements for a particular technology-based platform. The environment thus created can be further customized with provisioning of additional hardware/software resources per user requirements if so desired.

In an example, the LISA application is hosted on the cloud within a virtual private cloud network. The LISA application is communicatively coupled to a portal to receive user requests, various assessment tools, demand and supply management tools, client sites and the like. The LISA application can be accessed via graphical user interfaces (GUIs) which can either be activated through input devices such as a keyboard or a mouse or via voice commands. The LISA application thus forms a centralized access point for the assessment tools in addition to enabling the building of an environment for developing solutions.

When the user identifies an opportunity to develop a solution, the user may access the LISA application to obtain estimates of the resources required and the cost for procuring the resources. In an example, the LISA application receives from the user, information for determining the compliance of the solution with particular industry standard practices under different focus areas. The user's answers are scored and based on comparisons of the scores under each of the focus areas with the corresponding thresholds the extent of compliance of the solution with the industry standards under each of the focus areas is determined. The information supplied by the user may also include the specs such as capacity requirements as obtained from the assessment tools, the technologies on which the solution is based and the like. Based on the information obtained from the user's answers, the software/hardware requirements and compliance of the solution with the industry practices, the LISA application provides a recommendation to the user. The recommendation may include the estimates of the necessary resources and the associated costs. If the user consents to the estimates, the LISA application continues with provisioning the environment or creating the environment.

In an example, the LISA application can include a pipeline which executes processes for the automatic provision of the environment on a cloud platform. The environment for the user can be created on a virtual cloud platform which provides the user secure access to the environment within the larger ecosystem of the cloud platform. A pipeline can include one or more instruction sets for a series of processes that are executed by a processor hosting the LISA application in order to generate the environment as specified by the user. The pipeline initially receives the user's request for an environment put into LISA via an estimation GUI. In an example, the request from the estimation GUI can include a technology platform in which the user desires to create the environment. The choice of technology platform can specify the exact software that the user desires while the hardware specifications may also be provided via the estimation GUI. When hardware specifications are not provided by the user, the LISA application can be configured to assign certain minimum hardware resources to the environment by default.

Each of the technology platforms for which the LISA application is capable of generating the environment can have specific software resources associated therewith. Accordingly, the user's choice of technology platform can determine the software resources including servers, development tools, automated scripts and the like assigned to the environment. Based on the technology platform, the pipeline can generate a template which includes details regarding the software and hardware resources to be assigned to the environment. The template includes unique identifiers for images pertaining to the software resources such as the servers and the development tools to be provisioned for the environment. In an example, an image can be a DOCKER image which includes a combination of a file system and parameters. An image corresponding to a server or a development tool is identified within the template and an instance of the image (which can be referred to as a container) is created. Any number of containers can be created or instantiated from a given image. The template therefore enables creating the environment by instantiating containers corresponding to the various servers and development tools as specified by the technology platform. Moreover, the template can also complete the provisioning of the environment by securing the hardware resources for the environment.

Users who are responsible for identifying new opportunities for providing solutions have to access different tools in order to obtain assessments and cost estimates for particular opportunities. Moreover, technical personnel need to coordinate with different capability teams when creating blue prints and solutions for specific opportunities. The estimation or assessment for a new or an existing opportunity takes several weeks to complete and mostly involves costs and infrastructure specifications. In addition, the creation of an environment to begin coding for an opportunity may take several weeks to complete as it involves procurement, estimation, installation and tools set-up.

LISA application as described herein provides a technical advancement by providing a template that brings together the various software and hardware resources needed to create an environment. The templates corresponding to each of the technology platforms enable provisioning for the environment by the user merely providing an input that describes the requirements. By accessing and instantiating the images corresponding to the various software resources, the template provides for creating the environment in a few short steps as opposed to installing and configuring each of the tools separately. Through the LISA application, users can now access a single website that can connect them to different assessment tools. This is a flexible arrangement in that more tools can be added, via placing further images in the registry for example, if the existing tools do not answer the users' needs. The LISA application serves a middleware for the solution development process wherein information is collected from the assessment sites and passed on to a cloud service provider for creating an environment within a virtual private cloud within which the LISA application may operate. This can make the process highly efficient for the user as enormous time is saved since the need for coordinating between different teams to complete the procuring and configuration tasks is mitigated. When all the required information is available, the LISA application can complete the recommendation and opportunity assessment within a day.

FIG. 1 shows a block diagram 100 of a setup including the LISA application 108 in accordance with an example. The LISA application 108 provides a one-stop-shop for the various assessment tools. The LISA application 108 also allows flexibility in that any number of additional tools that may be required can also be added to the development platform 106. A user 150 such as a solution developer can access the LISA application 108 via a network 160 such as the internet to quickly obtain estimates 152 or assessments of resources that are required to develop and implement a solution in addition to the costs for securing the resources for the solution. In an example, the user 150 may access a my_Estimate application 124 to obtain the estimates 152. The my_Estimate application 124 may employ previously saved estimates 134 from the database 126 in order to obtain an estimate for the user's 150 solution. In an example, the saved estimates 134 may be used to train Artificial Intelligence (AI) components in generating the estimates 152. Moreover, the estimate for the user's 150 solution may also be saved for training the AI components in producing estimates for future enquiries.

Upon obtaining the costs, if it is determined that a solution is to be built, the LISA application 108 also enables providing an automatically provisioned environment 154 for that enables generating code for the solution in addition to the various development tools 156 that will enable building, testing and deploying the solution. In an example, the LISA application 108 can serve as a middleware that gathers information from the assessment tools 136 and creates the automatically provisioned environment 154 for the development of the solution. The solution can include one or more of a script, a code snippet, a code module, an application made up of a plurality of code modules or a suite of applications and the like that may be developed for client sites 140. The automatic provisioning of the environment may include automatically provisioning a server from the cloud 102 with specs obtained from the my_Estimate application 124. In an example, the LISA application 108 includes the core tools of a DevOps application and is built from a Linux Apache MySQL PHP (LAMP) stack. Accordingly, a database 110 included in the LISA application 108 and the database 126 included in the my_Estimate application 124 may be a MySQL database in accordance with an example. The LISA application 108 can be hosted on a virtual private cloud 104 which may be part of a cloud 102 platform that is commercially available such as but not limited to Amazon Web Services (AWS), AZURE, Google Cloud and the like. The LISA application 108 is coupled to a chat dashboard 122 that enables online chat support 112. In an example, the chat dashboard 122 may provide access to the chat logs 132 in order to enable the online chat support 112 by the LISA application 108. In an example, the chat logs 132 are stored for reference of chat support admin and will be reused as frequently asked questions (FAQs) and fed to speech and text AI.

Another mode of support may include the portal 142 where the user 150 can raise a ticket to have specific queries or requests handled. For example, creation or modification of an environment may require the user 150 to raise a ticket with the portal 142. A demand and supply management 138 tool may also be accessible via the LISA application 108. As will be described further infra, the LISA application 108 includes graphical user interfaces (GUIs) 116 and voice activated command interfaces that enable user-friendly access to the various functionalities of the LISA application 108. The GUIs 116 may include webpages that provide initial access to the LISA application 108 via, for example, a home page and usage of various tasks that are enabled by the LISA application 108 through other webpages.

A pipeline 114 enables the creation of the auto-provisioned environment 154 in an example. The pipeline 114 may include, for example, four jobs or processes that are run on servers of the cloud 102. The details of the solution requirements as produced by the my_Estimate application 124 may be passed on to the pipeline 114 as provisioning parameters that will trigger the creation of the auto-provisioned environment 154 from the cloud 102.

Figure 2:
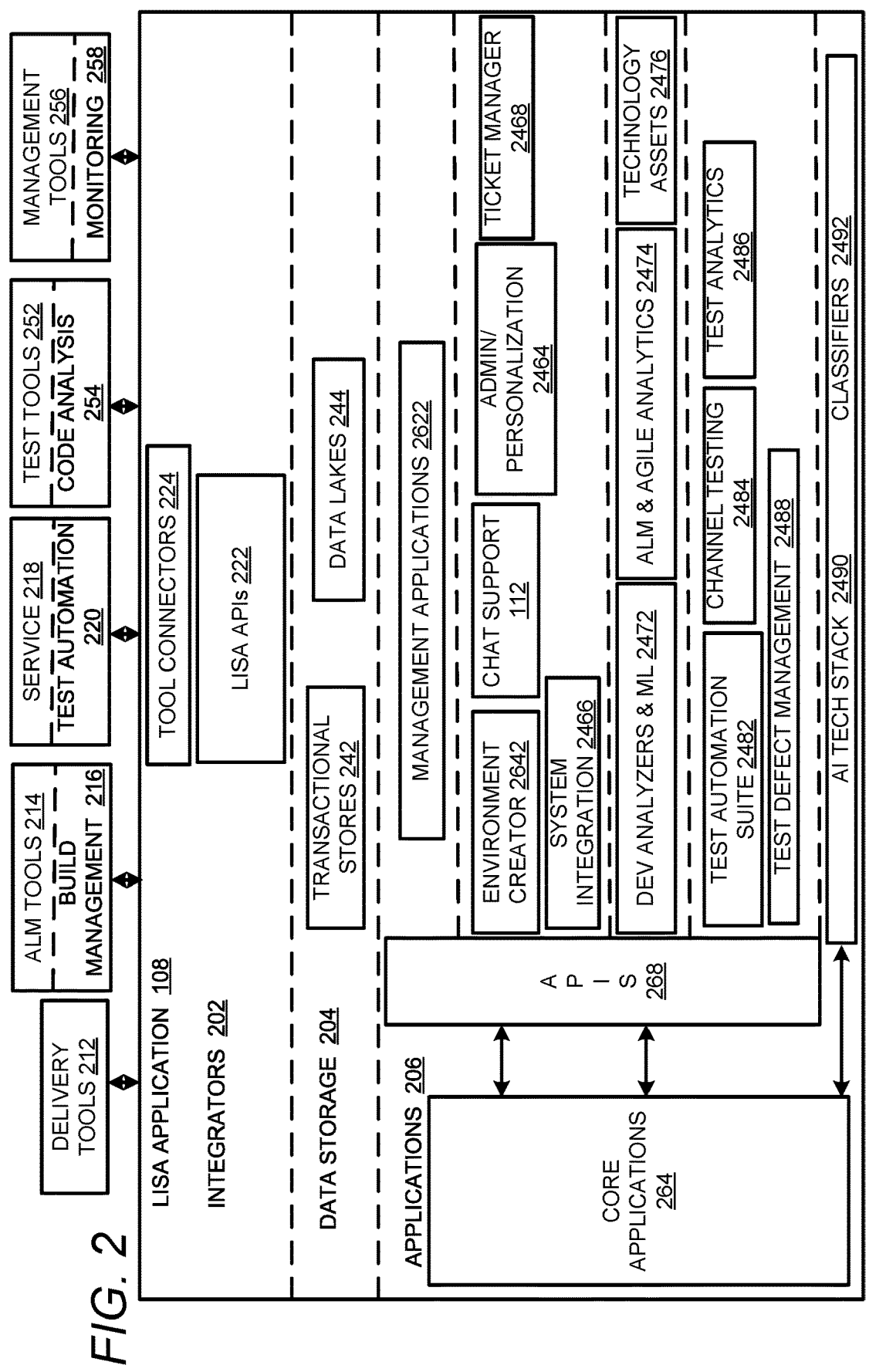
FIG. 2 is a block diagram showing the components of the LISA application and the various tools interfacing with the LISA application in accordance with some examples disclosed herein.

FIG. 2 is a block diagram showing the components of the LISA application 108 and the various tools interfacing with the LISA application 108 in accordance with one example. Different tools that are configured to work with the LISA application 108 may include but are not limited to, application lifecycle management (ALM) tools 214 (JIRA), tools for build management 216, delivery tools 212, service tools 218, tools for test automation 220, test tools 252 such as JENKINS, service management tools, test automation tools such as Selenium, code analysis tools 254 such as Sonarcube, management tools 256 and monitoring tools 258 for monitoring the functioning of a solution that was built with the LISA application 108. The LISA application 108 interacts with each of the tools using integrators 202 such as the LISA APIs 222 and the tool connectors 224 that enable connecting the LISA application 108 to each of the tools discussed above.

The LISA application 108 may also include data storage 204 such as transactional stores 242 and data lakes 244 which hold vast amounts of raw data in its native format in a flat architecture until required. The data may include data obtained from the various tools connected to the LISA application 108. Core Applications 264 are supported at the application layer 206 by the LISA application 108. The core applications 264 employ APIs 268 to execute the various tasks within the LISA application 108.

The LISA application 108 can include management applications 2622 which provide analysis and reports. The analysis involves processing of the estimates for example, from the my_Estimate application 124, and the reports may include reports regarding the servers to be provisioned, the tools required, the costs associated therewith and the like. The core applications 264 may also correspond to the environment creator 2642 which creates and provisions an environment for coding a solution, chat support 112 for the user 150 creating the environment, an application for admin/personalization 2464 of the LISA application 108, system integration 2466 which integrates various applications and tools within the automation application and the ticket manager 2468 which manages the various tickets that are placed for the different tasks to be carried out by the LISA application 108.

An artificial intelligence (AI) stack 2490 can be used to execute certain automatic functions within the AEP system 100. By the way of illustration and not limitation, the AI Stack 2490 can employ trained AI elements such as classifiers 2492 which are trained to evaluate the solution to be developed on the auto-provisioned environment 154 under different focus areas in regards to compliance with various industry standard practices and provide recommendations based on the evaluations. In an example, the various auto-provisioned environments can be stored in the data storage 204. The auto-provisioned environments, the recommendations provided to the environments, the extent to which the recommendations were implemented and the like can be used in training the classifiers 2492 in the evaluation of the solution and in providing the recommendations.

The applications 206 further include dev analyzers 2472 which analyzes the performance of a given solution or code which employ technologies such as machine learning (ML), agile analytics 2474 which is an incremental, iterative evolutionary style of development and technology assets 2476 used by the LISA application 108. The applications 206 further include applications for test automation suite 2482, channel testing 2484, test analytics 2486 and test defect management 2488. Each of the tools and applications described above enable the user 150 to create a project-specific environment based on the estimates 152. The auto-provisioned environment 154 thus created includes the requisite servers as determined by the estimates 152, the standard tools that are generally present in a development environment associated with the particular technology and automation scripts. In case additional tools are required, the LISA application 108 may be configured with access to the additional tools which may be include in the virtual private cloud 104 or may lie outside the virtual private cloud 104.

Figure 3:
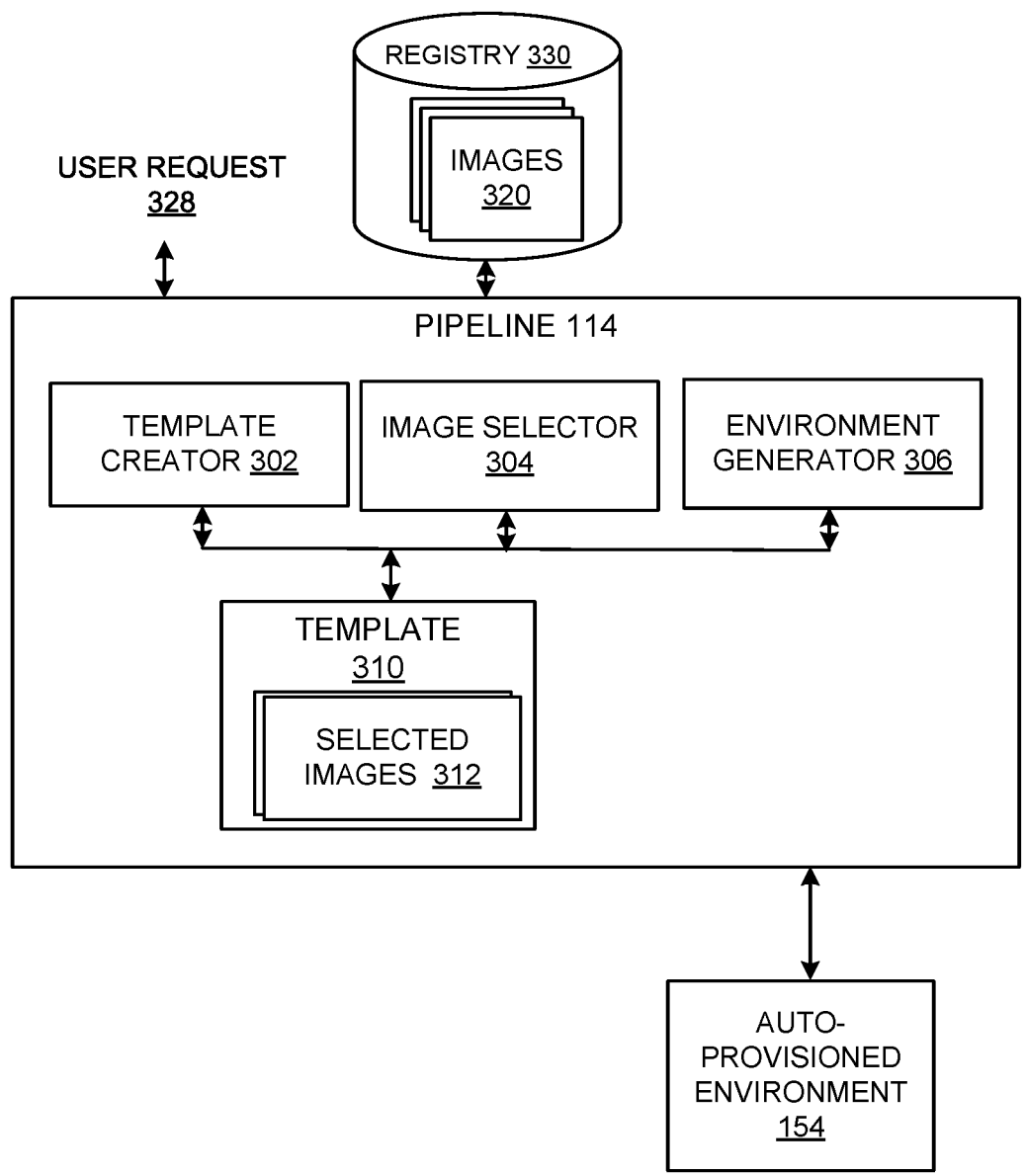
FIG. 3 shows a block diagram of a pipeline in accordance with one or more examples disclosed herein.

FIG. 3 shows a block diagram of the pipeline 114 in accordance with the examples disclosed herein. The pipeline 114 includes a template creator 302, an image selector 304 and an environment generator 306. The template creator 302 receives a user request 328 for creation of an environment. The user's request 328 can be made via accessing a web page such as an estimation GUI associated with LISA application 108. The entries provided by the user via the estimation GUI can be obtained and plugged into a template 310 by the template creator 302. In an example, the template 310 can be a Java Script Notation Object (JSON) file in which the values supplied by the user can be included for example, as name-value pairs describing various attributes of the auto-provisioned environment 154 to be created. In an example, the template 310 can provision an outer-proxy server which provides security and privacy to a core server (inner proxy) thereby saving the hardware resources of the auto-provisioned environment 154 from vulnerabilities associated with IP address concerns such as DNS/IP spoofing and the like.

The template 310 further includes code to access the various image files which correspond to the different servers and development tools to be included within the auto-provisioned environment 154. The image files 320 can be DOCKER images in a registry 330 from a local data store associated with the LISA application 108. In an example, the estimation GUI can include an override button which can allow the user to make changes to certain elements such as the name of the environment, the memory associated with the environment and the technological platform.

The selection of the technology platform by the user allows the image selector 304 to determine the various servers, development tools and the automated scripts to be included in the template 310. By the way of illustration and not limitation, the various platforms from which the user can choose may include JAVA, MICROSOFT, SALESFORCE, SAP and the like. Each of the platforms can have its own set of servers, operating systems, development tools and the like which need to be installed within the auto-provisioned environment 154 in order that a solution can be coded, tested and/or hosted on the virtual private cloud 104. Each of the images associated with the various servers, tools and the automated scripts can be uniquely identified via a unique id. The unique ids of the images corresponding to the particular set of servers, operating systems, development tools and automated scripts associated with the user's selected technological platform are received by the image selector 304. The unique ids can be used to retrieve or select a subset of the images 320 from the registry 330. The selected images 312 can be included in the template 310.

The template 310 including the selected images 312 is transmitted to the environment generator 306. The containers associated with the selected images 312 are instantiated by the environment generator 306. Access to the auto-provisioned environment 154 can be provided for example, via sending a link to the auto-provisioned environment 154 to the user via email, text message and the like. LISA application 108 therefore is able to take advantage of the image and container technology to instantiate complex environments including one or more servers, development tools and automated scripts using the template file 310. Therefore, an environment that would otherwise have taken months to develop can be up and running in as little as less than a couple of hours thereby increasing the efficiency of the software development process and improving the functionality of the cloud platforms. The solution developed using the auto-provisioned environment 154 can be hosted within the cloud platform 102 in an example. In an example, the solution can be exported to external systems after the development on the auto-provisioned environment 154. The details of the creation process of the auto-provisioned environment 154 can be logged to the database 110 and can be used to train the classifiers 2492.

Figure 4:
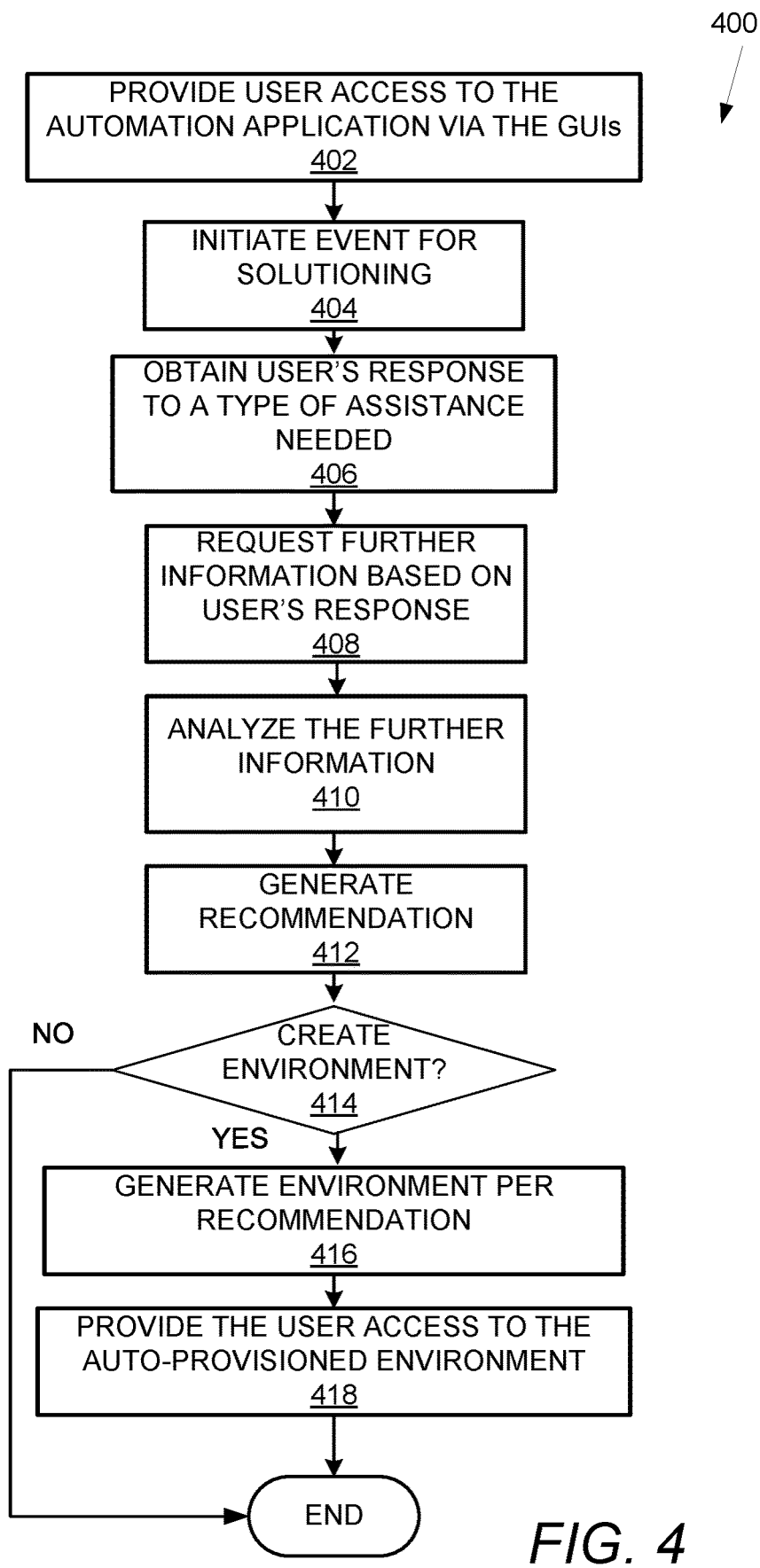
FIG. 4 shows a flowchart that details a method of generating an auto-provisioned environment in accordance with some examples disclosed herein.

FIG. 4 shows a flowchart 400 that details a method of generating the auto-provisioned environment 154 in accordance with an example. The method begins at 402 wherein a user is provided with access to a homepage of a web-based GUI associated with the LISA application 108 and user navigation to the tools page of the web-based GUI is enabled via the home page. The user 150 launches my_Estimate application 124 and accordingly, a click event initiates solutioning at 404. Upon receiving the user's click, the LISA application 108 responds to the user 150 at 404 by requesting that the user 150 provide information regarding the assistance that is required. Initially at the beginning of a project prior to building the solution, the user 150 may request an estimate for resource requirements and costs. Accordingly, the user's 150 response to the type of assistance needed is received at 406. Based on the user's response, the LISA application 108 may request further information at 408 regarding the solution such as the number of applications to be created or if a testing process needs to be provisioned for, the type of technology that the solution is based on and the like. The information gathered at 408 is analyzed at 410 via one or more assessment tools such as the my_Estimate 124 or other assessment tools 146. At 412, the LISA application 108 may identify gaps wherein additional resources may be required and generates a recommendation including the estimates 152. The estimates 152 include information regarding the tools currently in place, the cost of setting up the environment and the like.

In an example, the LISA application 108 initiates questions for assessment of the solutioning opportunity and users provide the information regarding the opportunity. The LISA application 108 may identify pertinent data for the assessment focus areas, for example, from the user-provided information. In addition, the LISA application 108 further analyzes the data to identify gaps based on the technology blueprint. The recommendations are then created from the identified gaps. After generating the recommendation, the LISA application 108 requests user feedback at 414 regarding whether the user 150 wishes to proceed with creating the environment. If yes, the environment is generated at 416 on the cloud 102 within the virtual private cloud 104. The generation of an environment may include procuring the various servers, installing the tools and embedding the various automation scripts for testing jobs and the like. Developers may then access the environment to develop, test and launch the code on production environment such as the client sites 140 in an iterative manner. The servers to be procured, the tools to be configured and the automation scripts to be embedded are obtained from technology-based blue prints. For example, a blue print for a Java-based solution may include the type of servers that need to be procured and the standard tools installed and the automation scripts that are embedded for automating the various steps of testing, launching and monitoring the developed code in the production environment. Some Java-based development tools may include but are not limited to the IDE (Eclipse or other similar tools) integrated with Git and Maven. Sonar-Qube for automated code analysis, and Selenium for automated testing. If at 414, the user no longer wishes to proceed with generating the environment, the process is terminated on the end block. At 416, the user is provided access to the auto-provisioned environment 154. In an example, a link to the auto-provisioned environment 154 can be transmitted, for example, via an email. In an example, an environments page associated with the user's 150 profile can be updated with a link to the auto-provisioned environment 154.

The server executing the LISA application 108 is hosted in the cloud 102 having dev ops tools such as my_Estimate 124, assessment tools, demand and supply management 148 and the like. Each of the tools may have their own dedicated Docker container. The containers may not bundle a full operating system but may contain libraries and settings required to make the tools and source code work as needed thereby making the LISA application 108 more efficient, lightweight and self-contained. The source code for the LISA application 108 may be stored in a source code database external to the cloud 102. Developers may initially check in their code to the external source code database which serves as the source code control. The code will then be deployed to the virtual private cloud 104 server. The LISA application 108 may connect to the database 126 in my_Estimate 124 tool to gather data.

Figure 5:
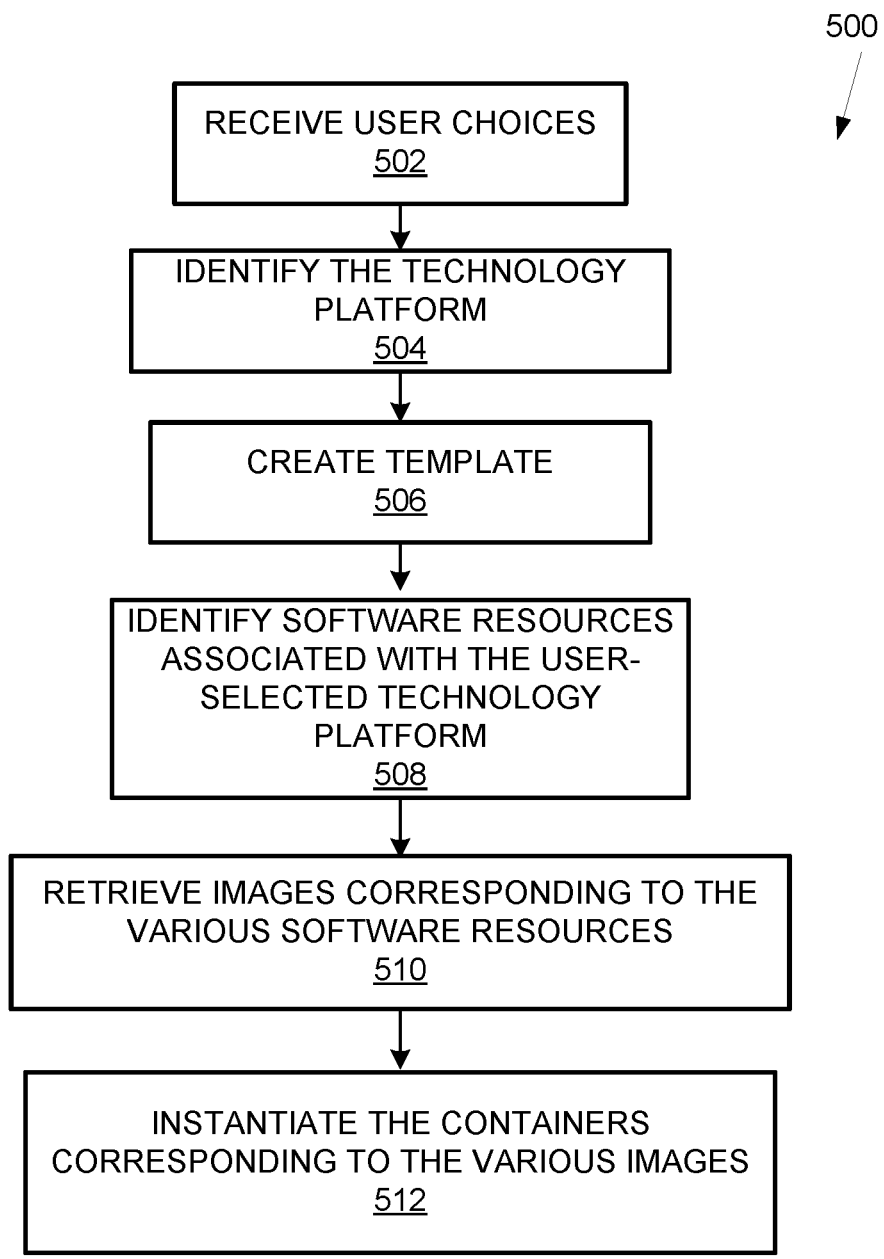
FIG. 5 shows a flow chart that details a method of generating the auto-provisioned environment in accordance with some examples disclose herein.

FIG. 5 shows a flow chart that details a method of generating the auto-provisioned environment 154 in accordance with examples disclose herein. The method begins at 502 wherein the values provided by the user via the estimation GUI are received. The values can include the attributes of the environment such as the name of the environment, the hardware requirements such as the memory required in addition to the technology platform on which the environment is to be created. Accordingly, at 504, the technology platform associated with the auto-provisioned environment as selected by the user is identified from the values supplied by the user at 502. A template including the user-supplied values is created at 506 based on the technology platform selected by the user. As mentioned herein, the user has an option to select from a plurality of technology platforms, a particular technology platform on which to generate the environment.

Each of the technology platforms can have a corresponding set of software resources which will be provided in an environment associated therewith. Some of the technology platforms may have one or more common software resources that can be provisioned. Accordingly, the user-selected technology platform is used to identify the various software resources such as the servers, the development tools and the automation scripts that are to be instantiated for the auto-provisioned environment 154 at 508. As mentioned herein, an image corresponding to a software tool can have a unique identifier and includes a file with the requisite parameters that is executed in order to have an instance of the software tool running on the virtual private cloud 104. Each of the technology platforms can be mapped to a set of image identifiers that correspond to the software resources that are to be instantiated within an environment that will be hosted on that technology platform. Therefore, the images associated with the various software tools to be instantiated are retrieved at 510 using for example, the mapping between the technology platform and the set of image identifiers. The various instances or containers of the software resources corresponding to the retrieved images are instantiated at 512 thereby automatically generating the auto-provisioned environment 154 per the user's specification within the virtual private cloud 104. In an example, the auto-provisioning of the environment can occur in a series of steps. The hardware or system resources from the cloud platform 102 can be initially assigned to the auto-provisioned environment 154. Therefore, LISA application 108 can proceed with setting up at least one of the servers on the cloud platform, instantiating the tools within the servers and enabling execution of the automation scripts within the auto-provisioned environment 154.

Figure 6:
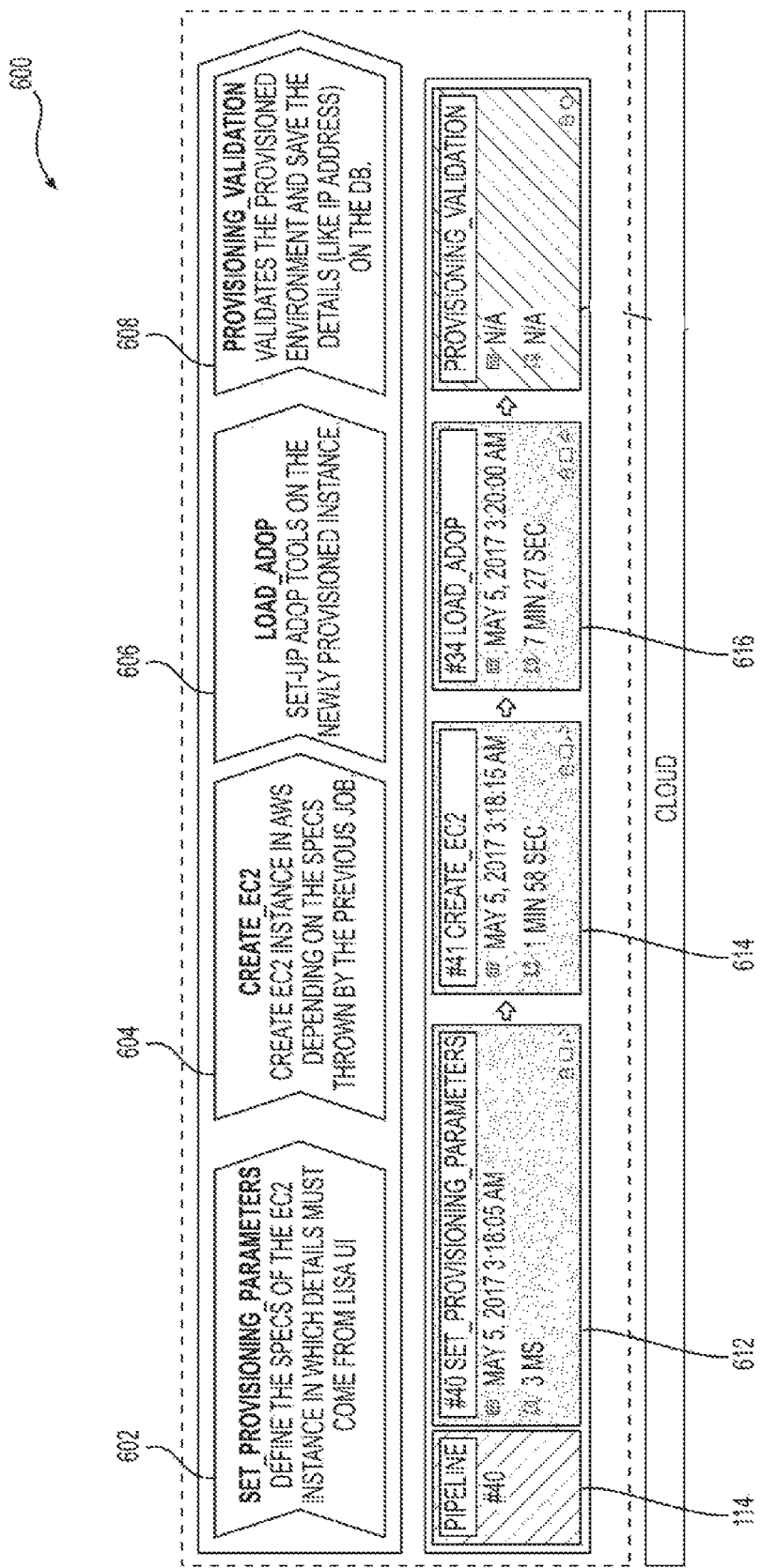
FIG. 6 is a flow diagram displayed on one of the GUIs of the LISA application in accordance with some examples disclosed herein.

FIG. 6 is a flow diagram 600 displayed within one of the GUIs 116 in accordance with an example. The flow diagram 600 details a method of creating an environment in accordance with an example discussed herein. The pipeline 114 having, for example, four jobs may run on the virtual private cloud 104 after the user 150 selects the create environment button on the GUI 116. In an example, the pipeline 114 may be displayed on one of the GUIs 116 so that the color of the step may indicate the success or failure of the step. As steps 602, 604 and 606 are executed, the corresponding logs 612, 614 and 616 are colored green thereby indicating that the steps have been successfully executed. The server details produced by the assessment tools such as the my_Estimate 126 can be passed on to the pipeline 114. Initially, a set_provisioning_parameters procedure or function may be called at 602 that will trigger the creation of the server at 602. Thus, an instance of the environment creator is defined in which the details come from the user 150 via the GUIs 160. At 604, the environment creator instance is created on the cloud depending on the specs obtained, for example, from the prior jobs. The various tools required for the development are now loaded and made available to the newly generated instance via the virtual private cloud 104 at 606. The newly provisioned instance or environment is validated at 608 and the details like the Internet Protocol (IP) address are saved to the database 110. As seen from the respective time stamps of 612, 614 and 616 it can be seen that the setting up of the provisioning parameters for the environment to loading the tools takes place in a few minutes. Thus, the LISA application 108 decreases the time taken to develop and implement a solution while increasing the efficiency of the code development process.

Figure 7:
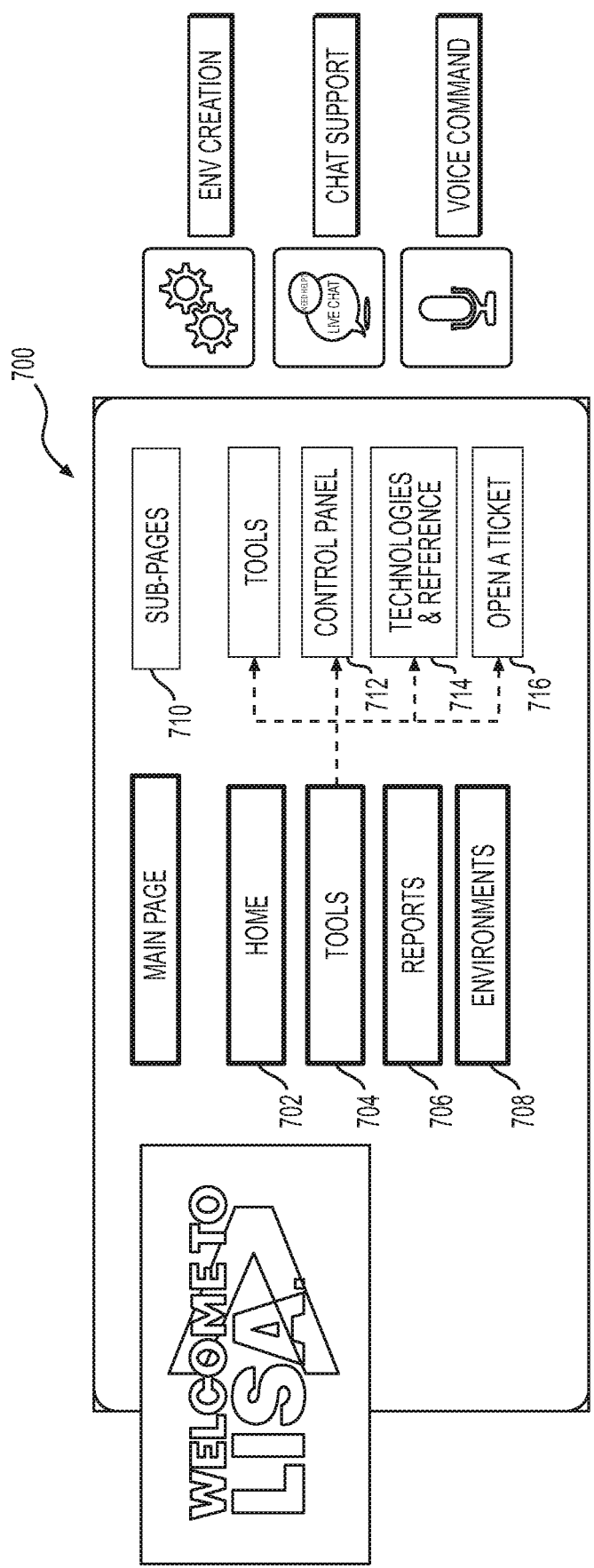
FIG. 7 shows the various pages that are part of the GUIs in accordance with some examples disclosed herein.

FIG. 7 shows a schematic display 700 of the various pages that may be part of the GUIs 116 in accordance with an example. The GUIs 116 may include a home page 702, a tools page 704, a reports page 706 and an environments page 708. When trying to access the LISA application 108 the user 150 initially lands on the home page 702 which shows the details and steps to be executed in order to access the functionality of the LISA application 108. The tools page 704 has three sub-pages 710 which include a control panel 712, technologies and reference sub-page 714 and a sub-page for opening a ticket 716. Each of the pages and sub-pages enables one or more functions of the LISA application 108 such as but not limited to environment creation, chat support or voice commands. In an example, the various pages, sub-pages and interactions therewith such as selecting the create environment button may be achieved via voice commands. The environments page 708 can provide access to the existing environments that the user currently has access to. In an example, the environments page 708 can also enable the user to create new environments as detailed herein.

Figure 8:
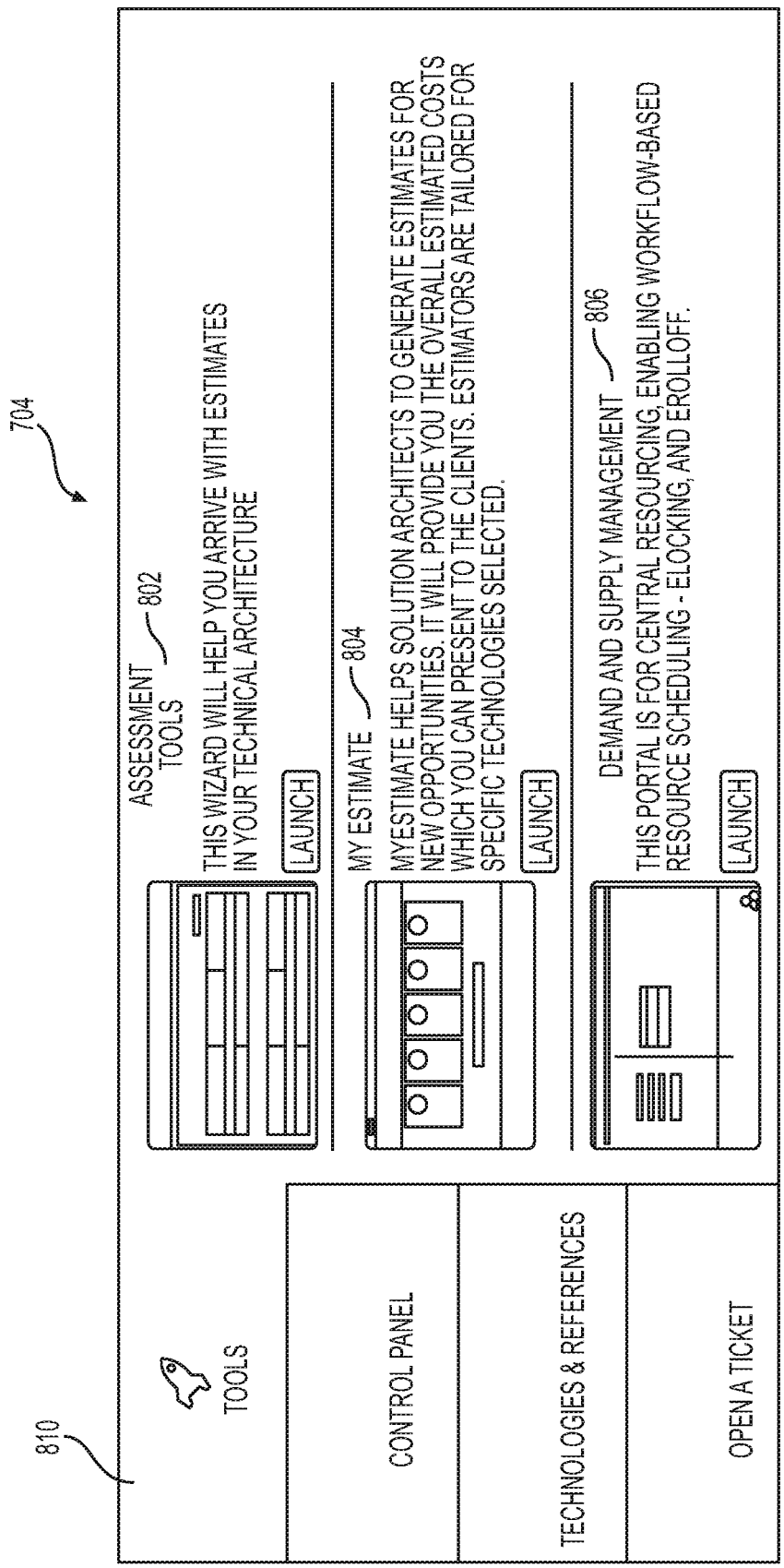
FIG. 8 shows the tools page in accordance with some examples disclosed herein.

FIG. 8 shows the tools page 704 in accordance with one example. The tools page 704 may be configured as a page with multiple tabs that provide access to the assessment tools 136, the my_Estimate application 124 and the demand and supply management 138 tool. Selection of a tab, for example, the tools tab 810 may show the elements of the tools page 704. The tools page 704 also includes brief notes 802, 804, 806 regarding the functions executed by each of the tools 136, 124 and 138.

Figure 9:
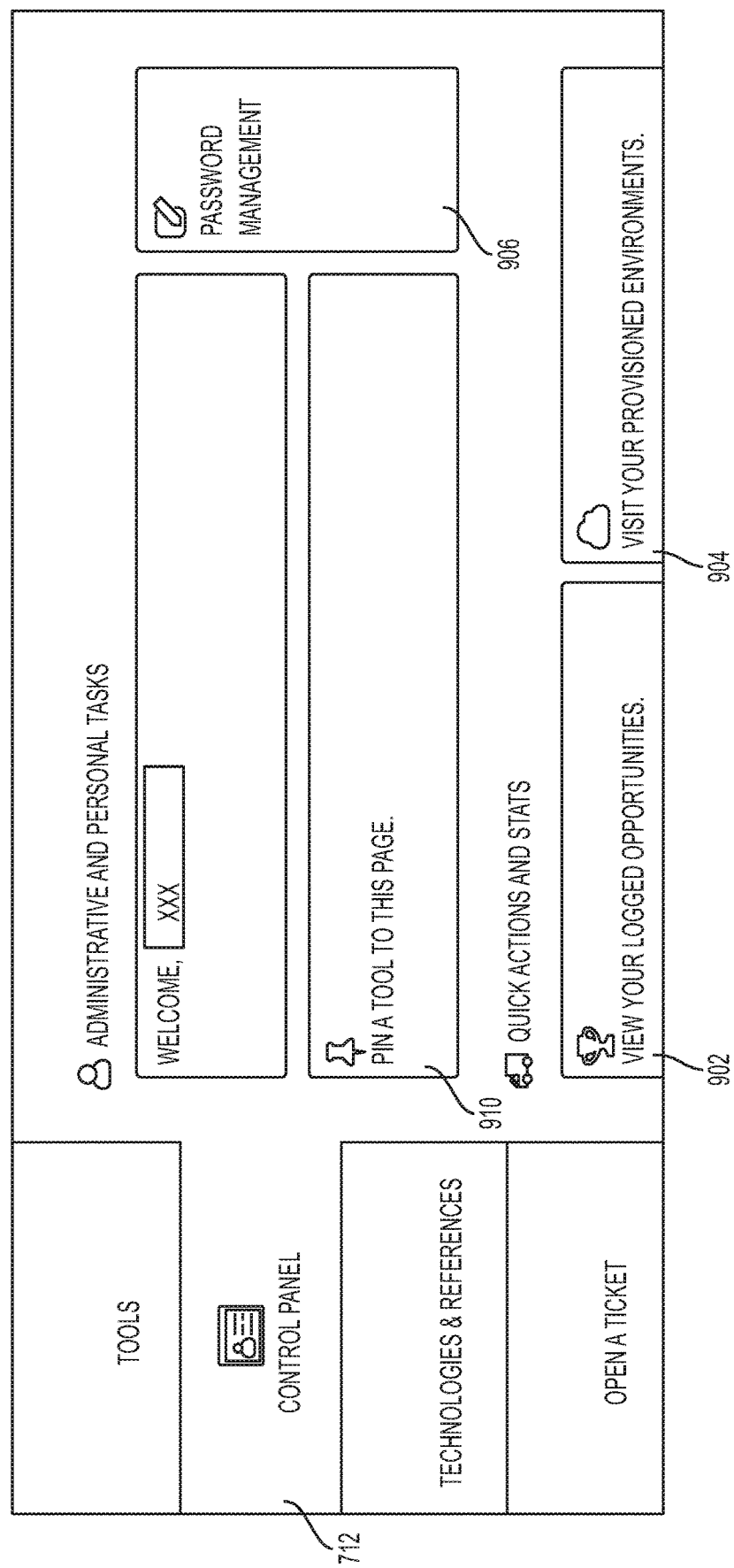
FIG. 9 shows the control panel sub-page of the tools page in accordance with some examples disclosed herein.

FIG. 9 shows the control panel 712 sub-page of the tools page 704 in accordance with an example. As seen from FIG. 7, the control panel 712 tab is selected from the multi-tab GUI. The control panel 712 enables the user 150 to carry out administrative and personal tasks associated with the LISA application 108. The control panel 712 sub-page allows access to selected tools available via the LISA application 108 by allowing the applications to be pinned 910 to the control panel 712 as shown at 710. Further actions that are enabled through the control panel 712 include viewing the logged opportunities 902 and visiting or opening the environments that were already provisioned such as at 904 by the LISA application 108. The control panel 712 also allows miscellaneous tasks such as password management 906.

Figure 10:
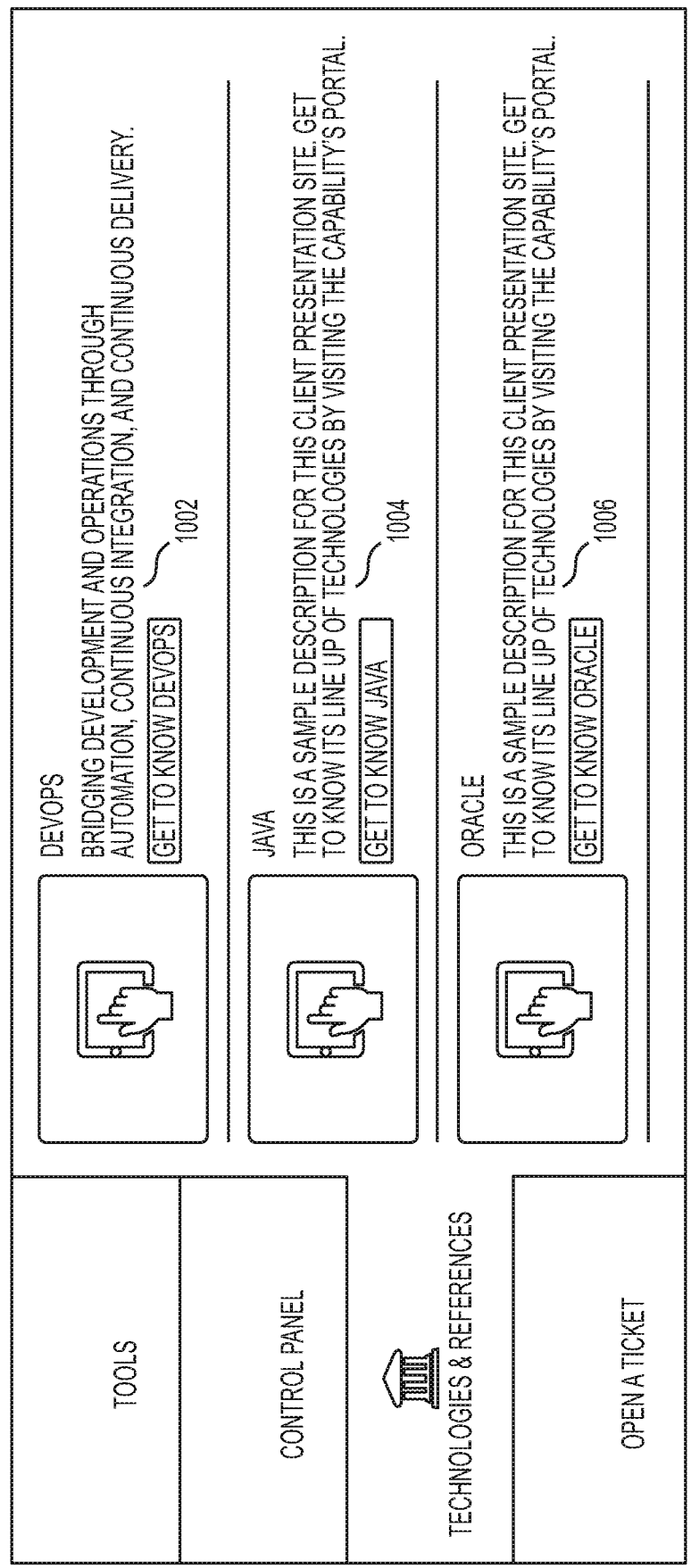
FIG. 10 shows the technologies and references sub-page of the control panel in accordance with some examples disclosed herein.

FIG. 10 shows the technologies and references sub-page 714 of the control panel 712 in accordance with an example. The technologies and references sub-page 714 shows the various technologies supported by the LISA application 108. The support may include creation of an environment to develop code based on the technology. In the example of FIG. 8, the LISA application 108 can support DevOps, Java and ORACLE technologies. Selecting each of the tabs 1002, 1004 and 1006 may cause further information regarding the corresponding technologies such as technical overview, blueprints and the like.

Figure 11:
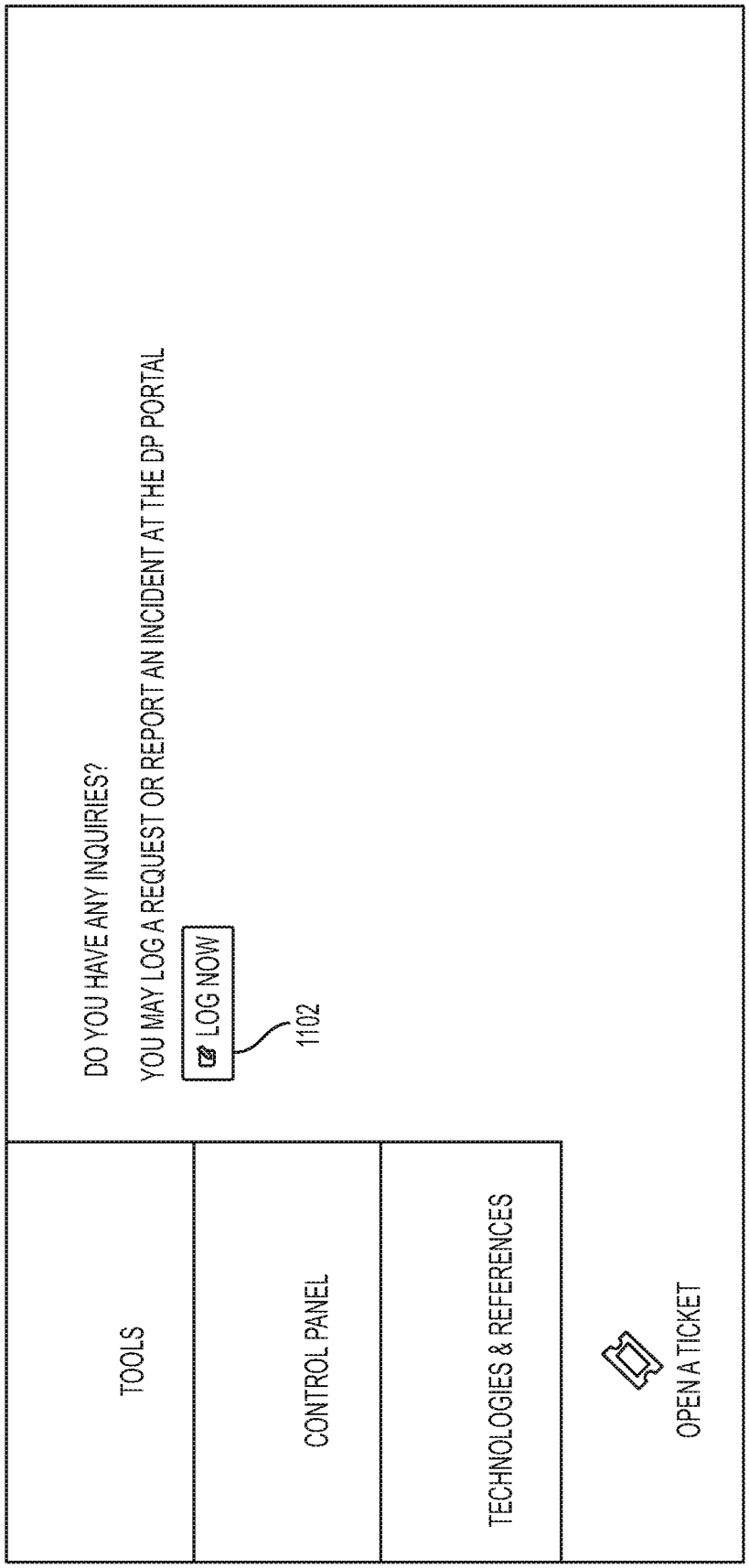
FIG. 11 shows the sub-page for opening a ticket in accordance with some examples disclosed herein.

FIG. 11 shows the sub-page for opening a ticket 716 in accordance with an example. The sub-page 716 enables the user to open a request or incident ticket through the portal 142. Clicking the log now button 1102 or uttering the "Log now" command opens a new tab within the portal 142 page. The portal 142 supports various capabilities including DevOps. Through the portal 142 tool, users can raise an enquiry or request services like training, assessments or operator assistance.

FIG. 12 shows the reports page 706 of the LISA application 108 in accordance with an example. The reports page 706 lists the tickets that the user 170 has logged in the my_Estimate application 124. Aside from displaying the tickets, the reports page 706 also provides buttons to upload images 1202 from the assessment tools 136, buttons to upload the reference files 1204 and buttons to create an environment 1206. Details regarding the tickets such as the technologies used 1208, the deal status 1210 and the like are displayed in the reports page 706.

Figure 13A:
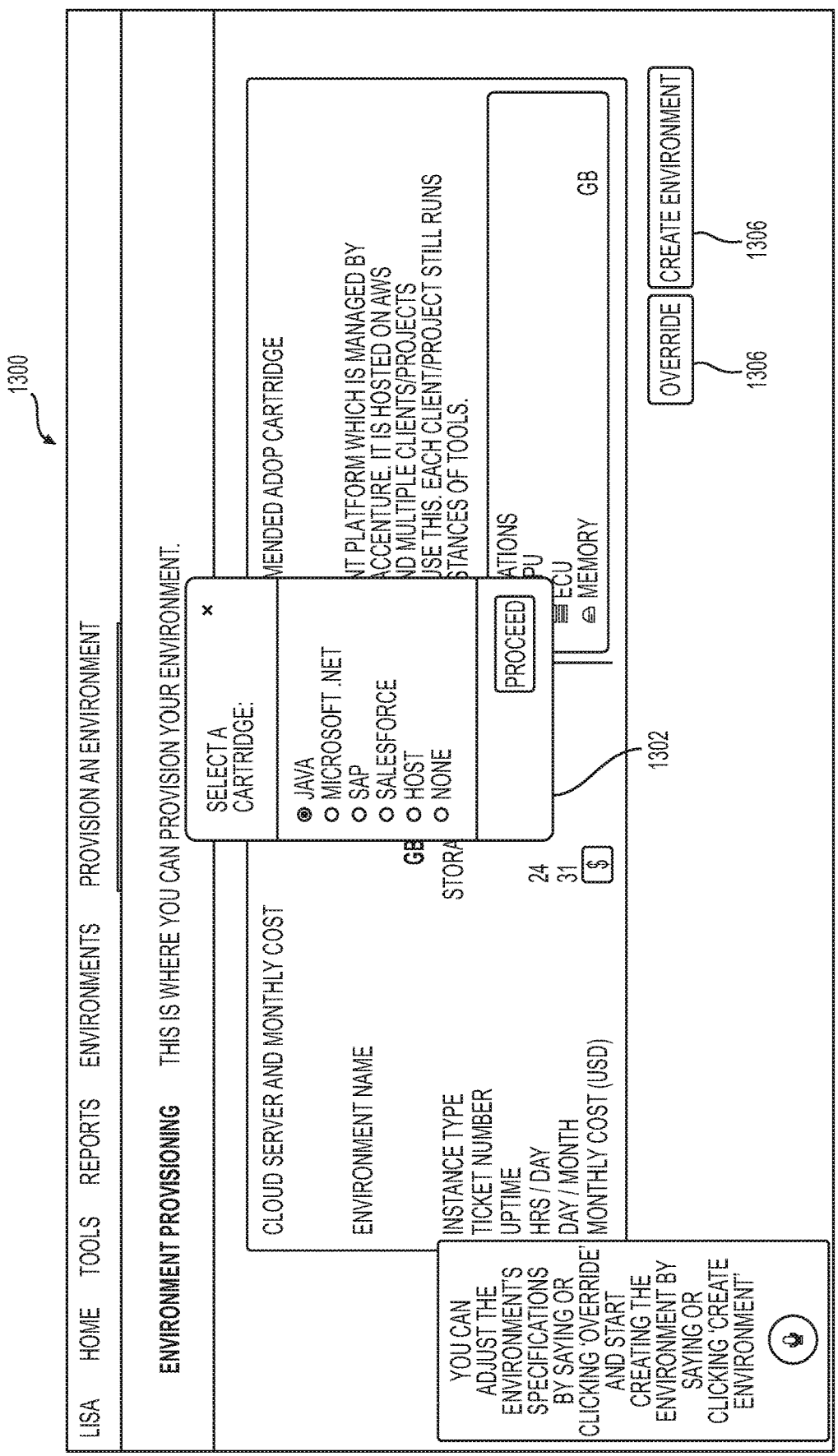
FIG. 13A shows a display which is used to collect a user's requirement regarding the technology platform for the creation of the environment in accordance with examples disclosed herein.

FIG. 13A shows a display 1300 which is used to collect the user's requirement regarding the technology platform for the creation of the auto-provisioned environment 154 in accordance with examples disclosed herein. The display 1300 provides the user 150 with user-selectable options 1302 of various technology platforms for which an environment can be created using LISA application 108. On selecting the required technology platform or cartridge from the options 1302, the user 150 can click the create environment button 1304 in order to have the environment auto-provisioned on the virtual private cloud 104 on the selected technology platform. The display 1300 also includes an override button 1306 that enables user-customization of the auto-provisioned environment 154 as detailed herein.

In an example, the auto-provisioned environment 154 can be created without the user accessing the my_Estimate application 124. In this instance, an input values button can be provided instead of or in addition to the override button 1306. The user may initially select the tab for provisioning the environment and then click the input values button. This can allow the user to enter the required details. Clicking the create environment button 1304 can allow the user to the select the technology and proceed with the creation. As described herein, upon the creation of the environment, the user can be notified, for e.g., via email. Additionally, the name of the environment and the IP address can be displayed on the environments page as detailed herein.

FIG. 13B shows a display 1350 that is generated during the creation and provisioning of an environment in accordance with an example. When the user 150 clicks or says "Create Environment" command after selecting a ticket from the Reports page, the display 1300 may show the specs of the environment that is provisioned by the LISA application 108. These specs are provided by the my_Estimate application 124 which are based on the estimation produced after assessment is conducted. After displaying the specs and costs, the LISA application 108 requests the user to select a cartridge for installation (e.g., Java, .NET, Oracle). Upon receiving the user's selection, a backend job is triggered that leads to the creation of a server in the cloud platform 102. The cartridge is made up of the jobs in the pipeline 114 and the configuration that is set up for the auto-provisioned environment 154 based on the technology selected. When the auto-provisioned environment 154 is created, the environments page 708 is updated with the information regarding the newly created environment.

Figure 14:
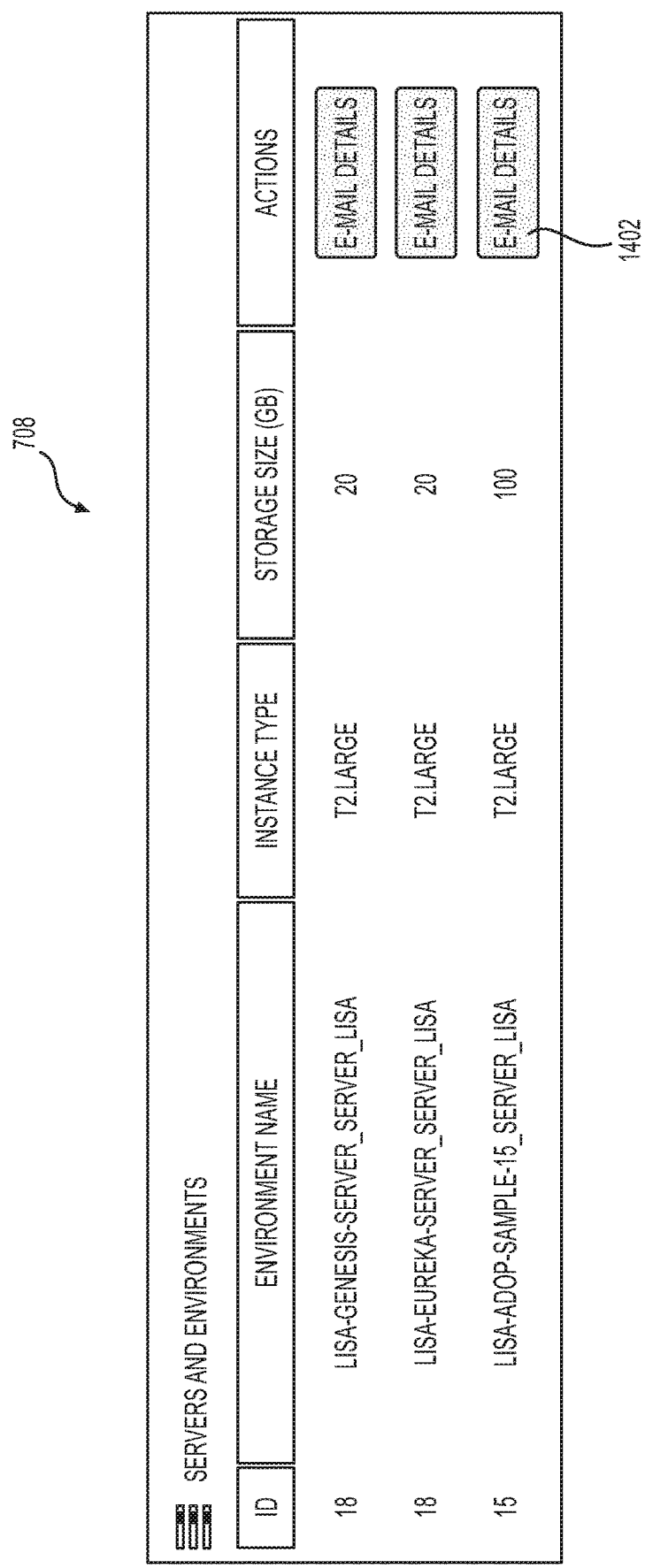
FIG. 14 shows the environments page that is generated by the automation application in accordance with some examples disclosed herein.

FIG. 14 shows the environments page 708 that is generated by the automation application in accordance with an example. The environments page 708 lists all the server/environments created by the user. It shows the basic specification of each cloud server such as the server name, instance type, storage size and the like. In an example, the environments page 708 may only be accessible to a user who created the environments. Accordingly, when the email details button 1402 is clicked, the LISA application 108 will send the corresponding server details to the email address associated with the environments page 708.

Figure 15:
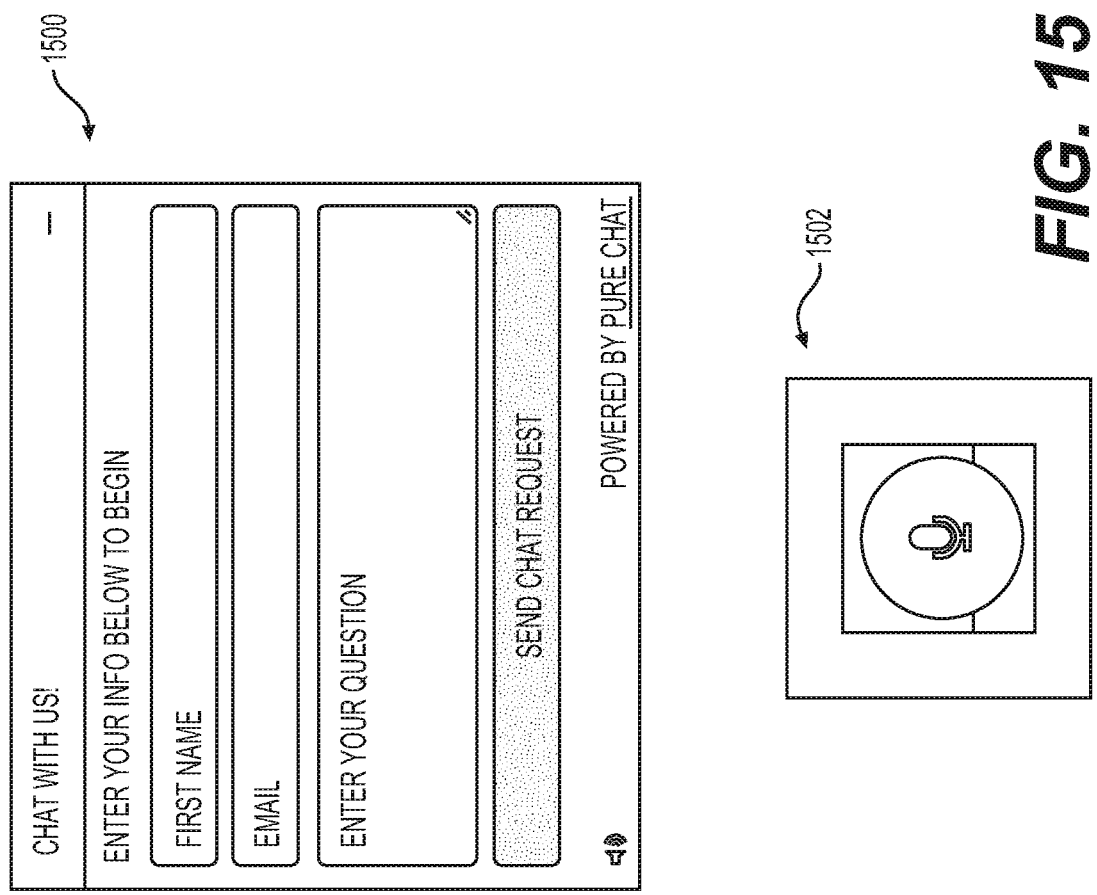
FIG. 15 shows a chat window that allows a user to send a chat request in accordance with some examples disclosed herein.

FIG. 15 shows a chat window 1500 that allows the user 150 to send a chat request. It allows the user 150 to talk to a support personnel for his/her concerns and questions. In an example, uttering a command such as "Chat Support" can make the chat window 1500 appear on the user's 150 display screen. In an example, a floating microphone icon 1502 allows the user to go through the pages via a voice command.

The LISA application 108 as described herein is a scalable and flexible application which has the ability to adapt to possible future changes in its requirements. Moreover the LISA application 108 was created to accommodate different groups and roles. Accordingly, it can address varied user needs for making comprehensive assessment of new opportunities, information and references about technologies, providing information quickly and efficiently and for creating environments for identified opportunities.

Figure 16:
FIG. 16 shows an estimation graphical user interface (GUI) or an estimation page that displays an estimation form for the technology of choice in accordance with an example disclosed herein.

FIG. 16 shows an estimation GUI or an estimation page 1600 that displays the estimation form for the technology of choice in accordance with an example disclosed herein. The estimation page 1600 includes three main panels, description 1602, breakdown of estimation 1604 and forms 1606. The description panel 1602 gives a brief overview of the technology platform of choice. The breakdown of estimation panel 1604 lays out key estimation results. The forms panel 1606 contains the questions that the user can answer to come up with an estimation. The forms panel 1606 can be defined by a series of screens or sections wherein each screen can be dedicated to a particular focus area or area of estimation which can include, for example, assessment, recommendations, details, full time employees (FTE) and summary. Various questions can relate to compliance of one or more of the solution or the generated environment with industry standard practices. In an example, the estimation GUI can also require the user to provide a scale of the solution which can include the number of applications to be on boarded as part of the solution. The user can select answers from options including 'not implemented', 'partially implemented' and 'fully implemented'. The users answers can be assigned a score and based on different formulae, the total score of the solution or the environment can be estimated. The total score can be compared to thresholds to determine one of red, amber and green (RAG) rating. In an example, the RAG rating for the solution under a given focus area can be obtained as the total score divided by the number of questions. In an example, the classifiers 2492 can be trained on previously generated environments to score the solution for various focus areas based on user responses. The AI tech stack 2490 can also include AI elements that can be trained to produce recommendations in response to user inputs across the various screens in the forms panel 1606.

Figure 17:
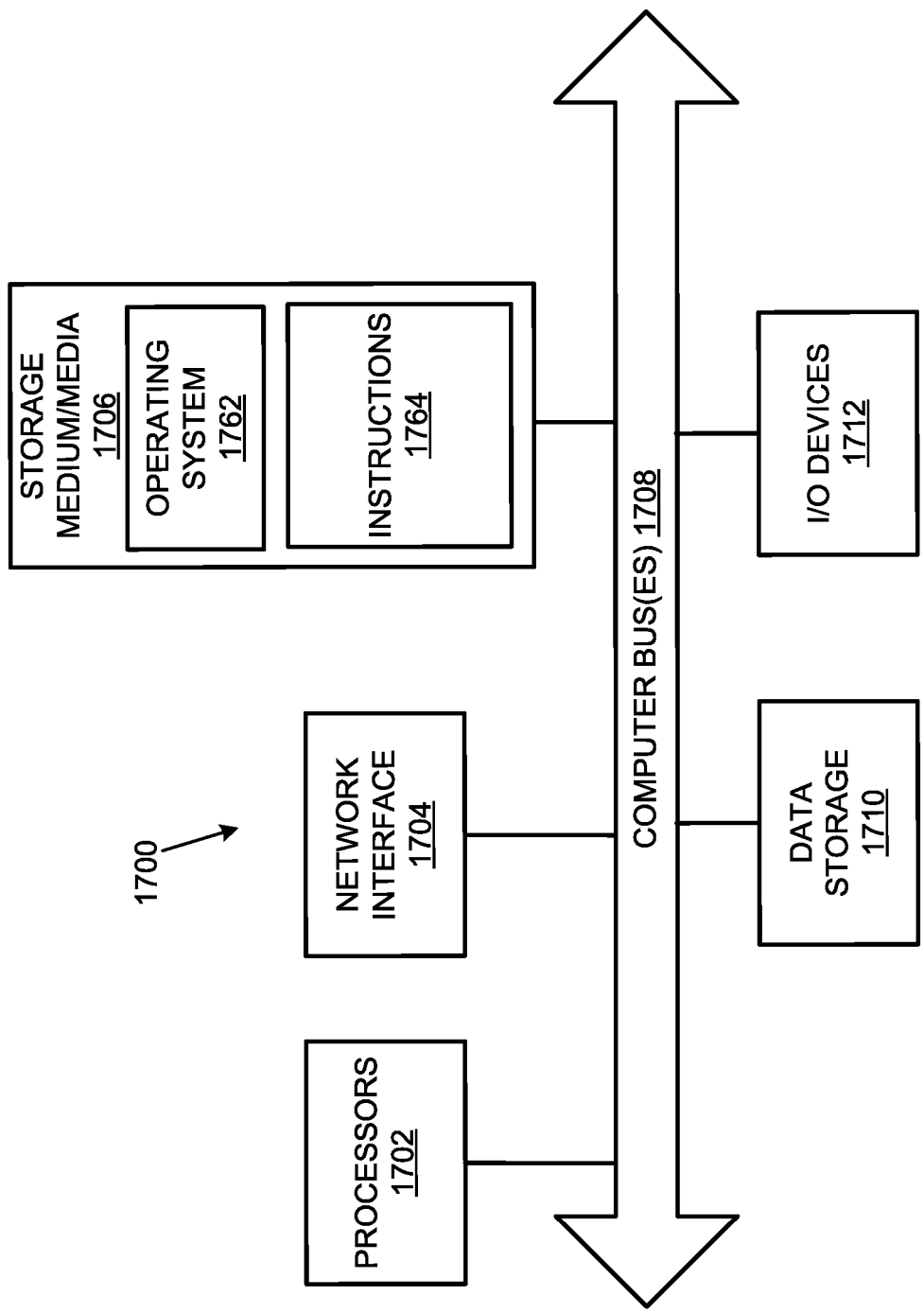
FIG. 17 illustrates a computer system that may be used to implement the LISA application in accordance with some examples disclosed herein.

FIG. 17 illustrates a computer system 1700 that may be used to implement the LISA application 108. The computer system 1700 may include additional components not shown and that some of the components described may be removed and/or modified.

The computer system 1700 includes processor(s) 1702, such as a central processing unit, ASIC or other type of processing circuit, input/output devices 1712, such as a display, mouse keyboard, etc., a network interface 1704, such as a Local Area Network (LAN), a wireless 802.11x LAN, a 3G or 4G mobile WAN or a WiMax WAN, and a computer-readable medium 1706. Each of these components may be operatively coupled to a bus 1708. The computer-readable medium 1706 may be any suitable medium which participates in providing instructions to the processor(s) 1702 for execution. For example, the computer-readable medium 1706 may be non-transitory or non-volatile medium, such as a magnetic disk or solid-state non-volatile memory or volatile medium such as RAM. The instructions or modules stored on the computer-readable medium 1706 may include machine-readable instructions 1764 executed by the processor(s) 1702 to perform the methods and functions for one or more of the tools or the LISA application 108. The computer-readable medium 1706 may also store an operating system 1762, such as MAC OS, MS WINDOWS, UNIX, or LINUX. The operating system 1762 may be multi-user, multiprocessing, multitasking, multithreading, real-time and the like. For example, during runtime, the operating system 1762 is running and the instructions 1764 are executed by the processor(s) 1702.

The computer system 1700 may include a data storage 1710, which may include non-volatile data storage. The data storage 1710 stores any data used by one or more of the tools or the LISA application 108. The data storage 1710 may correspond to data storage 204 which can be used to store the database 110 or the registry 330. In an example, the data store 1710 can be used to store real-time data or processed historical data which may include estimates 152, images 320, auto-provisioned environments 154, development tools and the like.

The network interface 1704 connects the computer system 1700 to internal systems for example, via a LAN. Also, the network interface 1704 may connect the computer system 1700 to the Internet. For example, the computer system 1700 may connect to web browsers and other external applications and systems via the network interface 1704.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. An automatic environment provisioning (AEP) system comprising:
at least one processor; and
a non-transitory data storage storing machine-readable instructions that cause the at least one processor to:
receive a user request to create an environment on a cloud platform, the environment pertaining to a technology platform and the environment comprising one or more of servers, development tools and automation scripts that enable developing a solution;
receive, via an estimation graphical user interface (GUI), further technical and capacity requirements regarding a type of the environment to be generated, wherein the estimation GUI includes user selectable options related to a solution to be developed within the environment;
score user responses to the user selectable options, wherein the user selectable options are associated with focus areas that pertain to compliance of the solution with standard practices, and the scoring of at least one of the user responses is based on whether at least one of the standard practices is fully implemented, partially implemented or not implemented;
provide recommendations to the user for implementing the solution on the cloud platform, the recommendations being generated for each of the focus areas based on comparisons of the scores of the user responses with corresponding thresholds, wherein providing the recommendations further comprises classifying the solution under one of a high, medium or low rating for each of the focus areas based on the comparison of the scores with the corresponding thresholds;
obtain, via the estimation GUI, further technical and capacity requirements from the user regarding a type of the environment to be generated;
provide for user selection, a plurality of technology platforms on which to create the environment;
create a template based on a technology platform selected by the user from the plurality of technology platforms, and the template being further generated from one or more of the recommendations and the further technical requirements, the template including identification of at least one image corresponding to the one or more servers, the development tools and the automated scripts to be included in the environment;
retrieve by the template, the at least one image from a plurality of images stored in a registry;
instantiate the at least one image on the cloud platform;
provision the environment including the servers, the tools and the automation scripts on the cloud platform based on the instantiated image and the technical requirements and the capacity requirements provided by the user; and
provide the user, access to the environment including the servers, tools and the automation scripts.

2. The AEP system of claim 1, wherein the estimation GUI further comprises a forms panel that includes questions to be answered by the user in order to obtain an estimate of resources required for the environment.

3. The AEP system of claim 2, the non-transitory data storage comprising further machine-readable instructions that cause the at least one processor to:
provide the questions to the user via a series of screens, the screens related to the focus areas of the solution that determine compliance of the solution with particular standard practices;
receive answers from the user to the questions in the screens; and
evaluate the answers based on predetermined scores.

4. The AEP system of claim 1, wherein the at least one image comprises multiple images respectively corresponding to each of the servers, the development tools and the automation scripts for provisioning the environment.

5. The AEP system of claim 4, the non-transitory data storage comprising further machine-readable instructions that cause the at least one processor to:
employ a unique identifier of each of the multiple images included in the template for the identification of the multiple images.

6. The AEP system of claim 5, wherein each of the multiple images respectively are associated with the template based on the technology platform selected by the user.

7. The AEP system of claim 1, wherein the template includes java script object notation (JSON) format.

8. The AEP system of claim 1, wherein the instructions to provision the environment based on the technical requirements further comprise instructions that cause the processor to:
receive from the user, a selection of a scale of the solution; and
provision the environment based on the scale of the solution selected by the user.

9. The AEP system of claim 8, wherein the scale of the solution corresponds to a number of applications on boarded to the environment.

10. The AEP system of claim 1, wherein the instructions to provision the environment further comprise instructions that cause the processor to:
provide the user with choices of technology platforms including the technology platform that can be instantiated and hosted in the cloud environment.

11. The AEP system of claim 10, wherein the instructions to provision the environment further comprise instructions that cause the processor to:
receive the user's selection of one of the choices of the technology platforms to be instantiated; and
assign system resources to the environment based on the scale of the solution and the user's choice of the technology platforms.

12. A method for automatically provisioning a development environment comprising:
providing, in response to a user request to create an auto-provisioned environment on a cloud platform, an estimation graphical user interface (GUI) that includes user selectable options related to a solution to be developed within the environment,
wherein the environment includes one or more of servers, development tools and automation scripts that enable code generation for the solution;
scoring user responses to the user selectable options wherein the user selectable options are associated with focus areas that pertain to compliance of the solution with standard practices, and the scoring of at least one of the user responses is based on whether at least one of the standard practices is fully implemented, partially implemented or not implemented;
providing recommendations to the user for implementing the solution on the cloud platform, the recommendations being generated for each of the focus areas based on comparisons of the scores of the user responses with corresponding thresholds, wherein providing the recommendations further comprises classifying the solution under one of a high, medium or low rating for each of the focus areas based on the comparison of the scores with the corresponding thresholds;
obtaining, via the estimation GUI, further technical and capacity requirements from the user regarding a type of the environment to be generated;
providing for user selection, a plurality of technology platforms on which to create the environment;
generating a template based on a technology platform selected by the user from the plurality of technology platforms and the template being further generated from one or more of the recommendations and the further technical requirements, the template including identification of at least one image corresponding to the servers and the tools;
identifying, using the template, the at least one image from a plurality of images stored in a registry, the at least one image being selected based on the technology platform;
provisioning the environment including the servers, the tools and the automation scripts on the cloud platform, the environment being provisioned based on the at least one image and the technical and capacity requirements provided by the user; and
providing the user, access to the environment on the cloud platform.

13. The method of claim 12, wherein providing the user access to the environment further comprising:
providing the user a link that enables access to the environment on the cloud platform.

14. The method of claim 12, wherein provisioning the platform further comprises:
instantiating the at least one image on the cloud platform, the at least one image corresponding to the technology platform and the at least one image corresponding to at least one of the servers and the tools.

15. The method of claim 14, wherein provisioning the platform further comprises:
setting up at least one of the servers on the cloud platform;
instantiating the tools within the servers; and
enabling execution of the automation scripts within the environment.

16. The method of claim 12, further comprising:
providing an override button that enables user customization of the environment.

17. A non-transitory computer-readable storage medium comprising machine-readable instructions that cause a processor to:
receive user request to create an environment on a cloud platform, the environment pertaining to a technology platform and the environment comprising one or more of servers, development tools and automation scripts that enable code generation for a solution;
receive, via an estimation graphical user interface (GUI), further technical and capacity requirements from the user regarding a type of the environment to be generated, wherein the estimation GUI includes user selectable options related to a solution to be developed within the environment;

score user responses to the user selectable options, wherein the user selectable options are associated with focus areas that pertain to compliance of the solution with standard practices, and the scoring of at least one of the user responses is based on whether at least one of the standard practices is fully implemented, partially implemented or not implemented;

provide recommendations to the user for implementing the solution on the cloud platform, the recommendations being generated for each of the focus areas based on comparisons of the scores of the user responses with corresponding thresholds, wherein providing the recommendations further comprises classifying the solution under one of a high, medium or low rating for each of the focus areas based on the comparison of the scores with the corresponding thresholds;

obtain, via the estimation GUI, further technical and capacity requirements from the user regarding a type of the environment to be generated;

provide for user selection, a plurality of technology platforms on which to create the environment;

generate a template based on a technological platform selected by the user from the plurality of technology platforms, and the template being further generated from one or more of the recommendations and the further technical requirements, the template including identification of at least one image corresponding one or more of the servers, the development tools and the automation scripts;

identify, using the template, the at least one image from a plurality of images stored in a registry, the at least one image being selected based on the technology platform;

instantiate the environment on the cloud platform based on the identified image;

set up the servers, the tools and the automation scripts within the environment in accordance with the instantiated image;

provision the environment including the servers, the tools and the automation scripts on a virtual private cloud on the cloud platform based on the instantiated image and the technical and capacity requirements provided by the user; and provide the user, access to the environment including the servers, tools and the automation scripts.

18. The non-transitory computer-readable storage medium of claim 17, further comprising machine-readable instructions for enabling user customization of the environment wherein the machine-readable instructions further cause the processor to:

edit one or more of name of the environment, instance type and storage size assigned to the environment.

* * * * *